April 11, 1950  E. S. FRIEDLANDER  2,503,718
ALTERNATING CURRENT ELECTRIC MOTOR EQUIPMENT
Filed Nov. 25, 1947  3 Sheets-Sheet 1

INVENTOR
ERICH SIEGFRIED FRIEDLANDER
ATTORNEY

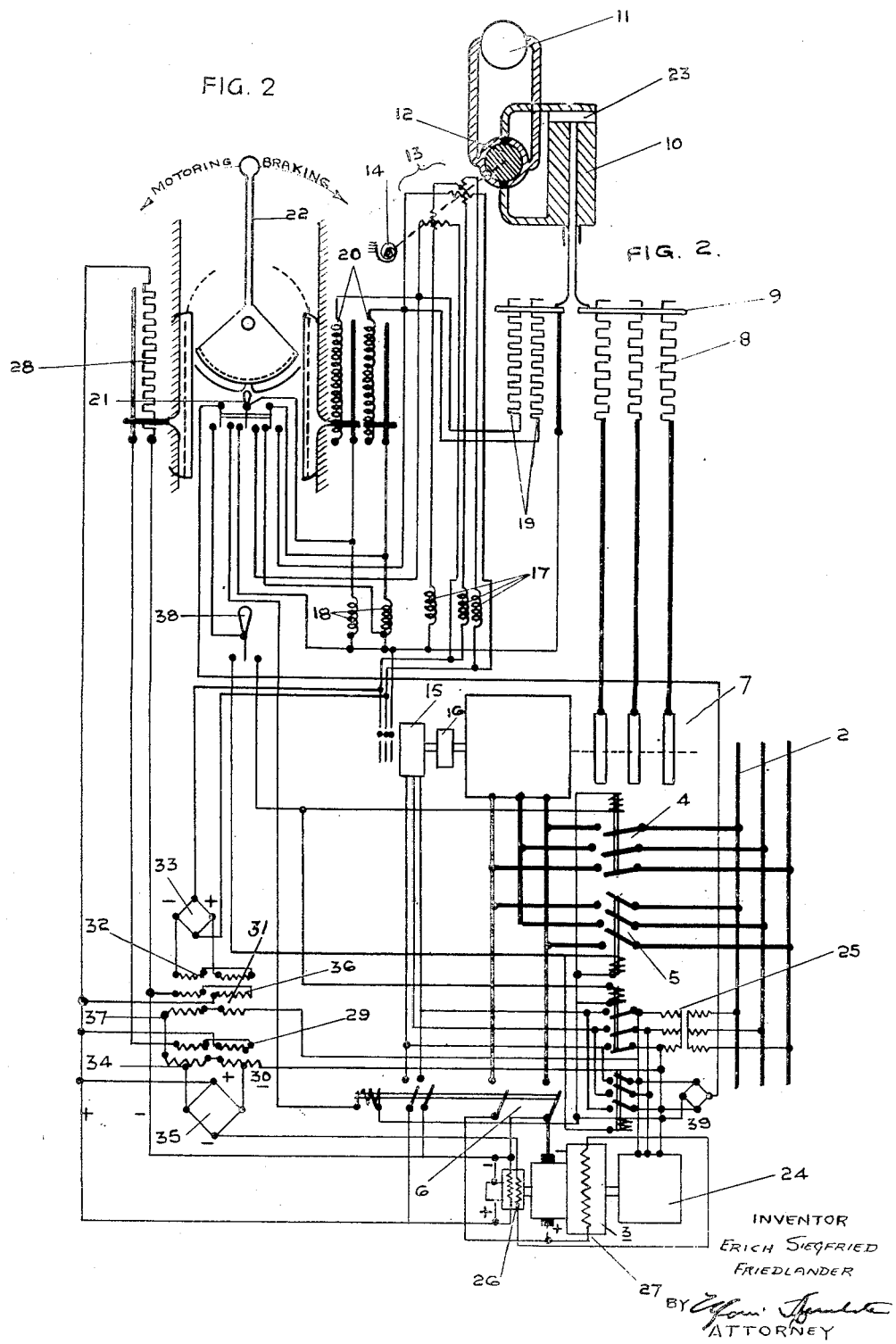

Patented Apr. 11, 1950

2,503,718

UNITED STATES PATENT OFFICE

2,503,718

ALTERNATING-CURRENT ELECTRIC MOTOR EQUIPMENT

Erich Siegfried Friedlander, Sutton Coldfield, England, assignor to The General Electric Company, Limited, London, England Application November 25, 1947, Serial No. 787,979
In Great Britain March 11, 1947

9 Claims. (Cl. 318—212)

This invention relates to alternating current electric motor equipments and more particularly, but not exclusively, to alternating current electric winding equipments of the kind including a wound rotor induction motor which may be arranged for dynamic braking.

According to the present invention, in an alternating current electric motor equipment of the kind including a wound rotor induction motor, resistance arranged to be connected with the generating winding of the motor during dynamic braking (or with the secondary winding during motoring) is arranged to be controlled in value by means responsive to or dependent upon the speed of the said motor in such a manner that with a constant value of current in the exciting winding (or with a constant voltage on the primary winding) the motor develops a braking (or motoring) torque that is substantially constant or follows a predetermined torque/speed characteristics.

The resistance may be a resistance associated with the wound rotor of the motor during both motoring and braking.

In designing A. C. electric winding equipment, certain considerations have to be borne in mind. Thus, it is advisable to avoid overheating of the motor when dynamic braking is applied at very low speed and for a prolonged period such as during regular shaft inspection. This overheating is caused by the fact that it is normally necessary to use the maximum or a high D. C. excitation of the stator winding of the motor at low speed to give sufficient braking torque and only if the load on the winding cage is low can a reduced D. C. excitation be used.

Figure 1:
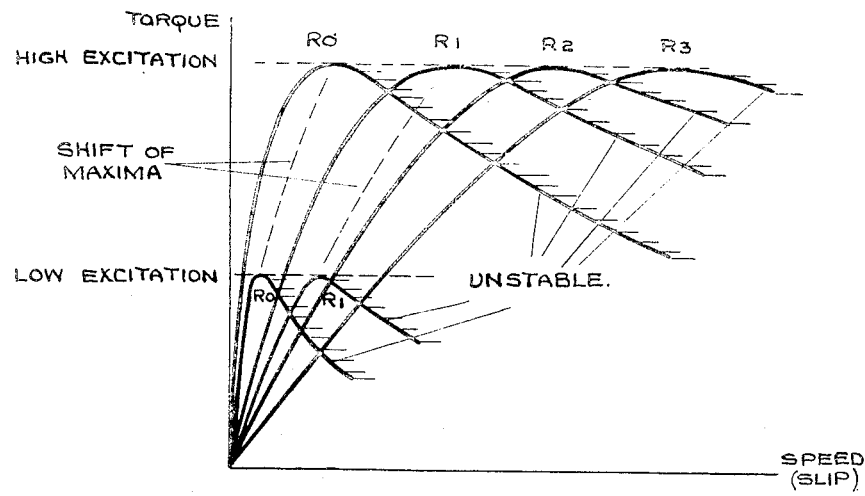
Figure 3:
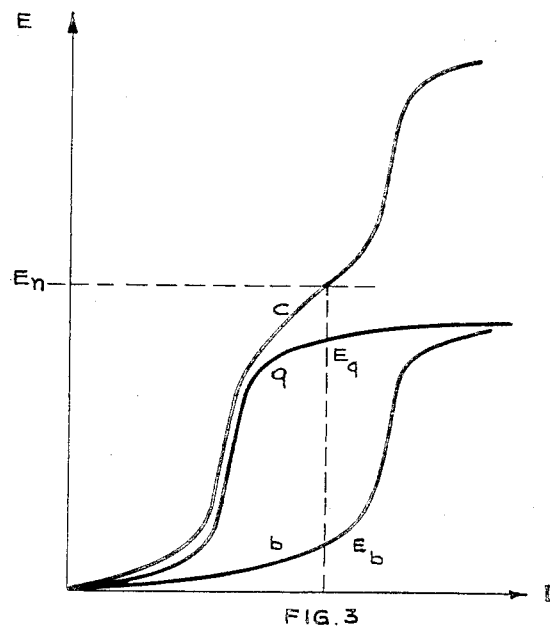
Figure 4:
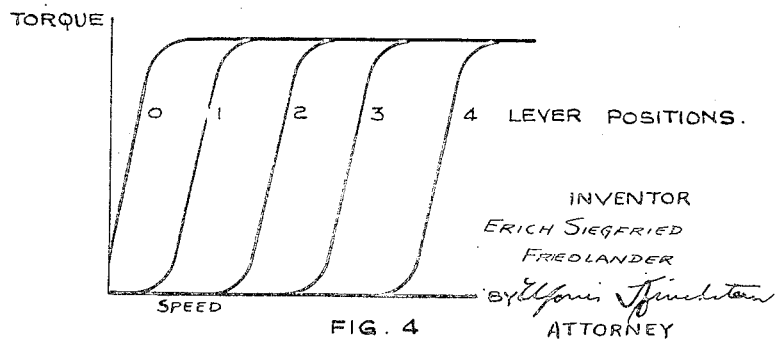
Figure 5:
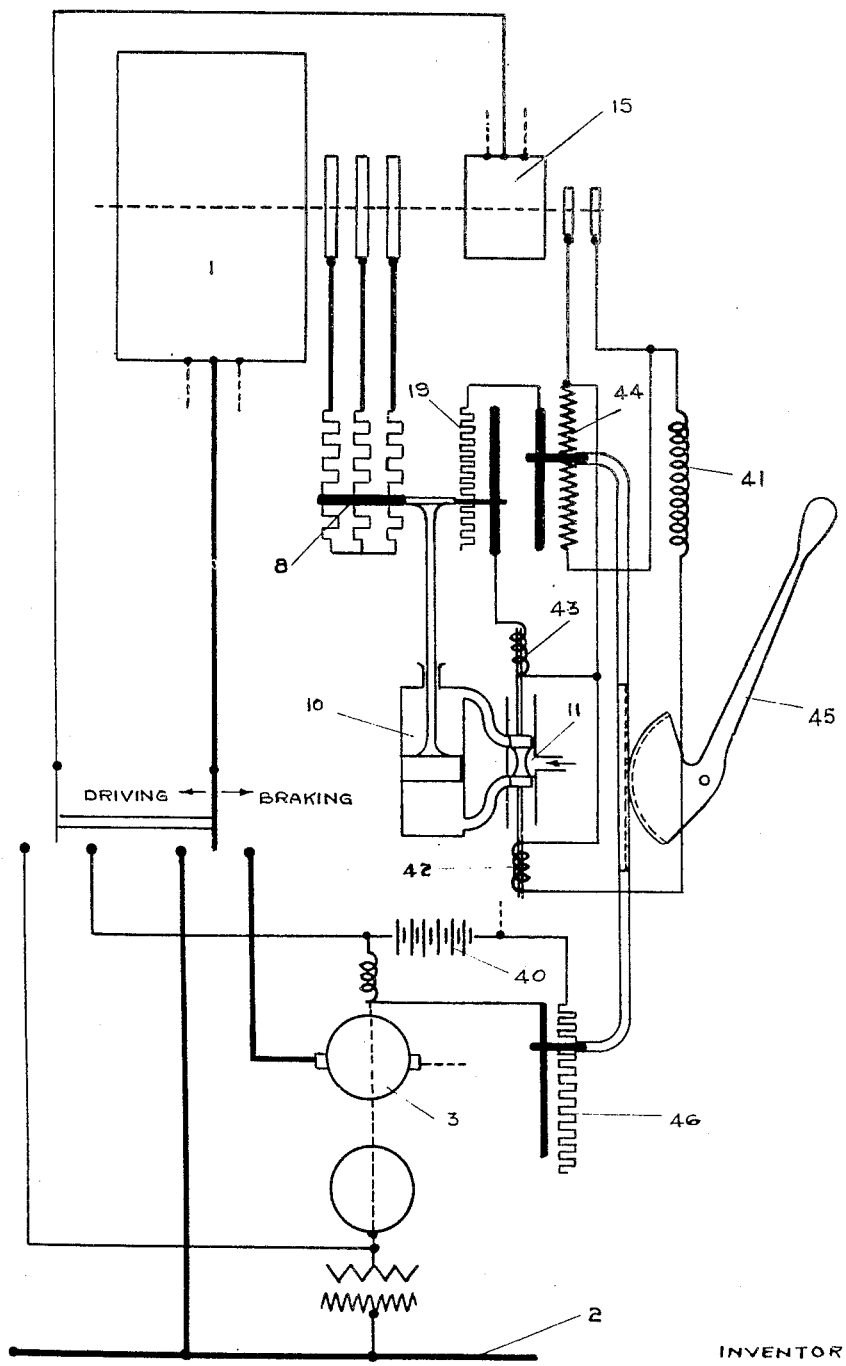

Another consideration which must be borne in mind is that, during braking with a constant D. C. excitation of the stator winding and a constant value of resistance in the rotor circuit, the braking torque first increases to a maximum value with increasing speed and then falls off again. It is obviously desirable, therefore, that in order to obtain the maximum braking torque at any speed with minimum D. C. excitation the value of the resistance should be controlled automatically in dependence upon the speed so that the braking torque is maintained at the maximum value for the particular value of D. C. excitation. In the five figures of the drawings accompanying this specification, Figure 1 shows the known relations between torque and speed of an induction motor during dynamic braking (or, on different scales, between torque and slip during motoring), Figure 2 shows the electric circuit of one A. C. winder equipment in accordance with the invention, Figure 3 shows the voltage/current characteristics of two D. C. controlled reactors forming part of this equipment, Figure 4 shows overall torque/speed characteristics of the motor during dynamic braking, and Figure 5 shows the electric circuit of a second A. C. winder equipment in accordance with the invention.

Referring now in detail to the drawings, in Figure 1 are shown one set of curves increasing values of rotor resistances R0, R1, R2, R3 for a high value of D. C. excitation of the stator and another set with the same rotor resistances R0, R1 for a lower value of D. C. excitation. As will be seen from the figure, each curve shows a maximum value of torque at a certain speed and as stable braking is only possible with constant excitation if the braking torque increases with speed, or with decreasing resistance, all those parts of the curves marked with hatching on the right hand sides of the maximum values are useless as far as normal stable operation is concerned. Increase of the resistance from say R0 to R1 and so on will however tend to maintain constant braking torque with increase of speed.

However, it is imperative even for transient control to prevent the braking torque decreasing with a movement of say the driver's control lever towards lower rotor resistance when in fact the torque should always increase. Therefore, it is necessary to link the control of the D. C. excitation with the control of the rotor resistance so that braking is commenced with high rotor resistance and low D. C. excitation and, as the resistance is reduced, so the excitation is increased. If this linking of the two controls is quite rigid, then from consideration of the curve of resistance R0 which might be the lowest resistance value, it is obviously impossible to obtain and apply maximum braking torque at the highest speed since the speed would lie beyond that giving the maximum torque with the resistance R0.

This difficulty can be overcome by the resistance control following the driver's control lever with some delay whilst the D. C. excitation control follows the lever without delay. In this way, full D. C. excitation can be applied by a rapid movement of the control lever when the rotor resistance is still high and the resistance is then reduced automatically in value at a definite rate which leaves time for the motor to decelerate so that the torque is maintained roughly constant. Obviously, the time delay must be so arranged with regard to the maximum load and the lowest deceleration that the equipment is not unstable.

An A. C. electric winder equipemnt in accordance with the present invention and in which the above considerations are taken into account will now be described by way of example with reference to Figures 2 to 4 of the accompanying drawings. In the equipment to be described, the rotor resistance is automatically controlled so that during dynamic braking its value is such that the maximum braking torque is available and the winder motor remains as cool as possible. The D. C. excitation is reduced automatically under conditions of shaft inspection to the minimum value at which the motor can just produce the required torque and automatic control of the D. C. excitation of the motor stator winding is provided.

Referring now to Figure 2, the A. C. electric winder equipment comprises a three-phase electric winder motor 1 the stator winding (not shown) of which is arranged to be supplied either from three-phase A. C. busbars 2 for motoring and reverse power braking or from a D. C. exciter 3 for dynamic braking. Three-phase contactors 4 and 5 control the connection of the stator winding to the A. C. busbars 2 whilst a two-pole dynamic braking contactor 6 controls the connection of the stator winding to the D. C. exciter 3. Permanently connected with the rotor sliprings 7 of the motor 1 is a three-phase liquid resistance 8, the resistance 8 operating both during motoring and braking, and the resistance is varied by a movable electrode member 9 operated by a servo-motor 10. The member 9 and servo-motor 10 may, of course, be replaced by any other suitable mechanism such as a motor controlled cam shaft mechanism controlling a grid resistance.

The servo-motor 10 is provided with a pump 11 and a valve 12 and the valve 12 is under the control of two coupled A. C. wattmetric type torque magnets 13 each having two operating winders. The relation between torque developed in the movable armatures (not shown) of the torque magnets 13 and current is independent of frequency and, in this case, the torque magnets 13 are arranged as a two-phase system to remove any vibrational torques and at the same time increase the safety of operation because it duplicates the controlling part of the circuit. Each half of it should give correct operation by itself if the other half fails. The armatures are connected to the valve 12 of the servo-motor 10 and a spring 14 normally maintains the armatures in their central positions when no torque is exerted on them.

The current controlling the torque magnets 13 and valve 12 is supplied by a tachogenerator 15 driven by the motor 1 and excited with direct current during dynamic braking and alternating current during motoring and reverse power braking in a manner similar to the motor 1. The tachogenerator 15 is a three-phase/two-phase machine and the number of poles thereof is chosen so that its output frequency is the same as that in the rotor of the motor 1. Gearing 16 may be used so that the tachogenerator need not have as many poles as the winder motor 1 but, in any case, the output frequency of the tachogenerator should be equal or proportional to that in the rotor of the motor 1.

Each of the two torque magnets 13 has two current systems which are supplied from voltages derived from the two-phase tachogenerator 15 which are 45° phase-displaced with respect to each other. The current to one system passes through relatively large reactors 17 and therefore lags 90° behind its supply voltage whilst the other current passes in parallel through reactors 18 and resistors 19 during dynamic braking and through reactors 20 and the resistors 19 during motoring. The change over between the alternative reactors 18 and 20 is controlled by a three-pole switch 21 which follows the movement of a driver's control lever 22.

The displacement in phase of 45° between the supply voltage for the current systems of the torque magnets 13 and the phase displacement of 90° between one voltage and its corresponding current by the reactors 17 means that, in order that the two currents should be 80° out of phase relative to each other and the torque magnet armatures be in their positions of equilibrium with no torque acting thereon, the other current must be phase displaced 45° lagging with respect to its voltage. Under such conditions, the spring 14 maintains the armatures in their central positions and the control valve 12 in the position shown in which the servo-motor 10 is inoperative and the values of resistors 8 and 19 fixed. Now the phase displacement of 45° between voltage and the current passing through resistors 19 and reactors 18 or resistors 19 and reactors 20 is only achieved if the condition $r_1 = 2\pi f_b L_1$ or $r_1 = 2\pi f_s L_2$ where $r_1$ is the value of resistors 19, $L_1$ and $L_2$ the values of reactors 18 and 20, $f_b$ the braking frequency and $f_s$ the slip frequency during motoring. The frequencies $f_b$ and $f_s$ are derived, of course, from the tachogenerator 15.

During dynamic braking, if the value of the resistors 19 is constant, then the value of the reactors 18 will vary with $f_b$, that is to say with the rotor speed of the motor 1. Assuming for the moment that the D. C. excitation of the motor stator is constant and that the rotor speed and value of resistance 8 are at their maximum values, then the torque magnets 13 are operated to open the valve 12 in such a direction that the plunger 23 of the servo-motor 10 moves the member 9 to reduce the values of the resistors 19 and resistance 8 until the condition $r_1 = 2\pi f_b L_1$ is satisfied. When the condition is satisfied, it is arranged that the value of the resistance 8 is such that the motor exerts its maximum braking torque at the set speed and D. C. excitation.

The braking torque slows the motor 1 down, the frequency $f_b$ is reduced and the phase displacement between the current and voltage of the torque magnet systems connected with the resistors 19 and reactors 18 changes from its 45° value. This opens the valve 12 again in the same direction and until the value of the resistors 19 again satisfies the condition $r_1 = 2\pi f_b L_1$ to give a maximum braking torque. The value of the resistors 19 therefore follows the frequency of the motor rotor so as to keep the 45° condition satisfied and so as to maintain the braking torque at a maximum value by control of the rotor resistance 8.

A similar control of the resistance 8 is effected during motoring with the only difference that the other reactors 20, which are adjusted by movement of the control lever 22, replace the reactors 18. Upon the driver moving the control lever 22 a slight amount away from its central position to the motoring side, the winder motor stator is connected to the A. C. busbars 3 and the tachogenerator 15 is excited by alternating current instead of as with direct current during dynamic braking.

The output frequency of the tachogenerator 15 is now a measure of the slip frequency of the motor 1 and is highest when the motor 1 is at a standstill with its stator winding energised. Further, the value of the reactors 20 is highest at the commencement of movement of the lever 22 from its central position. In order therefore to satisfy the condition $r_1 = 2\pi f_s L_2$, the servomotor 10 operates to make the values of resistors 19 and resistance 8 large when the motor 1 is at a standstill. If now the motor 1 runs up with very light load, the resistance 8 will be reduced in value in proportion to the decreasing slip frequency and the low initial motoring torque will be maintained until the resistance 8 is short-circuited completely or the torque reaches the value corresponding to the position of the control lever 22.

If, on the other hand, the control lever 22 is moved from its central position rapidly into the full torque motoring position, the value of the reactors 20 is at a minimum which minimum value is that giving the maximum torque of the motor 1 at any speed. The servomotor 10 only follows up therefore to the point where the condition $r_1 = 2\pi f_s L_2$ Min holds, $L_2$ Min being the minimum value of the reactors 20, and the resistance 8 is only reduced to zero as the slip frequency $f_s$ decreases.

It will be observed that the currents in the coils of the torque magnets 13 are almost constant and independent of the speed of the motor 1. This is advantageous in that constant sensitivity of control results. The reactors 17 should be relatively large in order to maintain the resistance of the circuits containing these reactors at a low value and thereby ensure that the currents flowing at the lowest slip frequency still gives sufficient operating torque. The two right hand coils of reactors 17 shown side by side are preferably wound on the same iron core. Any inaccuracies introduced by the losses of the reactors 17, 18 and 20 can be compensated for by grading of the resistors 19, and/or by suitable connection of the phase angle of the respective voltages.

The D. C. exciter 3 arranged to energize the stator winding of the motor 1 during dynamic braking is driven by a three-phase A. C. synchronous motor 24 fed from the A. C. busbars 2 through a transformer 25. The motor 24 also drives a pilot exciter 26.

The field winding 27 of the D. C. exciter 3 is fed by the exciter 26 with a control voltage being introduced in series to the exciter commutator voltage. The function of this control voltage is to produce maximum excitation during braking when the speed of the motor is too high and to make the excitation vanish or be reduced to a minimum if the speed is too low. The correct speed at which the desirable sharp transition between these extremes will occur depends on the current passing from the pilot exciter 26 through a variable potentiometer resistance 28 and the split D. C. winding 29 of a D. C. saturated control reactor 30.

The resistance 28 is under the control of the driver and varies with the position of the lever 22 when this is moved in the braking direction. Another D. C. saturated control reactor 31 has a split D. C. winding 32 excited by a rectified current which is derived from the tachogenerator 15 through a metal rectifier 33. The control voltage in the field circuit of the main exciter 3 is equal to the difference between the rectified A. C. voltage obtained from tappings on the A. C. winding 34 of the reactor 30 through rectifier 35 and the voltage of the pilot exciter 26, both of which must therefore be chosen in proper relation to the main exciter voltage.

An auxiliary D. C. winding 36 on reactors 31 serves to introduce a bias excitation which maintains the main exciter voltage up to zero speed, the A. C. winding 37 of the reactor 31 being connected in series with the winding 34 of the reactor 30 across two phases of the secondary output of the transformer 25.

The functioning of this circuit will be understood by reference to Figure 3 of the accompanying drawings which shows in curves $(a)$ and $(b)$ the voltage/current characteristics the A. C. windings of two equal pairs of D. C. controlled reactors as shown in Figure 2 which are excited with different D. C. ampere turns.

Curve $(c)$ shows the sum of both voltages with the same currents if both reactors are connected in series as in Figure 2. Now let $E_n$ be the voltage applied to both reactors. This voltage will then be distributed very unequally, the reactor with the lower D. C. excitation taking the bulk $E_a$ of the applied voltage, while the other is left with $E_b$.

If the D. C. excitation of both reactors is altered so that the one which had the large excitation would get less and the one with the lower excitation more, the voltage distribution on the A. C. windings would be altered only very little until the D. C. ampere turns on both reactors approach equality. The distribution then varies rather steeply. The voltages on both reactors are equal when the D. C. excitations are the same on equally built reactors, and with further alteration, the voltage distribution will be reversed so that the other reactor which has now less excitation will take over the bulk of the voltage.

The steep variation of the voltage, which at the same time is limited can be used for controlling the field current of the main D. C. exciter 3 so that the braking adjusts itself to the value which keeps the motor 1 approximately at a definite speed. This automatic and steep variation of the D. C. excitation is necessary for permitting the motor to run continuously on a maximum point of its speed/torque characteristics. It would even be possible to keep the motor stable on the sloping sections of the torque characteristics of Figure 1 which are marked as unstable since this instability refers only to constant excitation. The result of this type of control will be that the torque speed characteristics for the motor under conditions of dynamic braking will be of the general type shown for various lever positions in Figure 4 of the accompanying drawings.

It will be appreciated that during dynamic braking the saturated control reactor 30 acts, in effect, as a substantially constant current arrangement and may therefore be replaced by any alternative arrangement, for example a circuit of the Boucherot type, which will supply a substantially constant pre-set value of current to an A. C. circuit.

Since the resistance 8 keeps automatically to the optimum value, the motor 1 would not be overheated on the slow wind unless the speed is reduced far beyond the correct value for inspection.

The voltage of the pilot exciter 26 is not constant but is made to vary between definite limits on low and maximum excitation of the main exciter machine. The voltage of the tachogenerator 15 is therefore increased in proportion to the increased voltage of the pilot exciter 26 from which its D. C. excitation is derived during braking. This variation does not affect the proportionality between the D. C. currents on the reactors 30 and 31 and the varying voltage does not affect the angle relation of 45° phase displacement for which the torque magnet control is set.

The reactors 18, however, can be designed so that they become saturated with a higher voltage. The inductance of the reactors 18 thus becomes automatically a function of the D. C. excitation which causes the values of the resistors 19 and the resistance 8 to be lower at high excitation than on low excitation for any given speed. This is the performance needed to secure optimum performance of the motor 1 under conditions of braking and especially for the slow wind during shaft inspection. Alternatively the control circuit can be operated with constant voltage but the reactance of the reactors 18 reduced with increasing excitation by D. C. premagnetisation which can be derived directly from the main exciter current, the excitation voltage or the field current of the exciter generator. The reactors 18 and 20 may then also be connected in series to resistors 19.

The control lever 22 is shown in Figure 2 in a simplified manner. The actual distribution of movements for driving and braking in both directions will depend on requirements and it is obvious that there is no difficulty in satisfying the conditions of "H-lever" control as well as a "double lever control" (one for driving, one for braking) with the equipment described. The control for changing the direction of motoring is shown as a separate lever 36 which would be controlled in practice by an axial movement of the lever 22 if H-lever control is desired. Similarly the control of the resistance 23 and reactors 20 would have to change sides by a simple mechanical transmission if the lever 22 is moved axially for H-lever control.

The operating of the various contactors 4, 5 and 6 for alternative A. C. or D. C. excitation of the motor 1 is to be controlled so that contactors 5 and 6 are energised with a slight delay after contactors 39 or 49 so that the resistance 8 has reached its correct position before the A. C. voltage is applied to the main motor 1.

This is a safeguard against the possibility that the operator may move the lever 22 very rapidly from the full braking position to driving or reverse power braking. The resistance 8 may be made to move by itself slowly into the maximum resistance position whenever the torque magnets 13 are entirely de-energised. This can be achieved by a slight displacement of the zero position on the restraining spring 14 or by a suitable oil leakage path on the valve 12. It will be seen that the torque control, by the reactor 20 works equally correctly on reverse power braking as on driving due to the slip frequency being represented correctly in the windings of the torque magnet.

The switching on of the D. C. excitation of the main motor 1 could similarly be made to follow the excitation of the tachogenerator 15. However, this is not necessary because the braking current is sufficiently limited anyway.

Obviously, in the arrangement shown in Figure 2, suitable interlocks will be provided and, if desired, in order to compensate for change in the liquid resistance 8 with temperature, the resistors 19 may also be liquid resistors. In this case, by earthing the tachogenerator control circuit at the resistors 19, the resistance 8 and resistors 19 may work with the same liquid.

Though the description of the automatic control has been confined to arrangement in which the frequency of the controlling tachogenerator is equal to that in the generating winding of the motor the invention is not confined to this relation. More generally these frequencies need only be proportional to one another.

The method of controlling the valve, relay or the like by two opposing torque magnets lends itself also to a system of locking the contactors applying A. C. voltage to the main motor until the resistance 8 is brought to its maximum value. For this purpose, both A. C. contactors may be interlocked in the zero position of the control lever and at the same time energise that torque magnet which carries the resistance current and therefore tends to increase the resistances 19 and 8 by any independent auxiliary current. The resistance will thereby be increased rapidly and reach the end stop of their possible control range. An auxiliary contact operated at this end stop is then used to cancel the locking of the A. C. contactors. This interlocking should take place any time the control lever is brought to the zero position and should hold itself until the resistors have reached the end stop whatever lever movements the operator may have made in the meantime. No time delay and consequently no independent contactors are required in this case for energising the main motor and the tachogenerator.

Alternatively, the arrangements described above for automatic speed control during dynamic braking could be omitted and the D. C. excitation controlled directly by the resistance 28. The control would in this case connect the lever position with torque for braking, in the same manner as for driving. It would, however, be necessary for the driver to keep a constant watch on the speed and to vary his excitation continuously to keep torque and weight in balance for constant speed.

The corresponding modification of the A. C. electric winder equipment shown in Figure 2 and hereinbefore described is shown in Figure 5 and in which like parts have been given the same reference numerals as in the said Figure 2.

Referring now to Figure 5 from which all auxiliary items, such as contactors and locking relays, have been omitted, and which shows only a single line connection for the three wire A. C. and two wire D. C. connections, the three phase winder motor 1 has a stator winding (not shown) arranged to be supplied from the three phase A. C. busbars 2 for motoring or from a D. C. exciter 3 for dynamic braking. The value of the motor resistance 8 is controlled by the oil servo motor 10 and the valve 11. The tachogenerator 15 is arranged to be excited by connecting across a constant A. C. voltage of the supply frequency during motoring and by direct current from a constant voltage source, such as the battery 40, during dynamic braking.

This arrangement has an advantage that only a single reactor 41 of a constant inductance is used in the control current during both motoring and dynamic braking. The reactor 20 is of the normal gap type and no saturated reactor is required.

During motoring since the excitation of the control generator 15 is constant, the voltage across the sliprings of this generator is proportional to the slip frequency. Equally proportional to the rotor frequency is the reactance of the reactor 41. The current in the lower coil 42 controlling the servo-motor 10 is therefore constant, and the control valve can be returned into the centre position only by a correspondingly equal or proportional current in the upper coil 43 which is fed by current passing through the resistance 19. If the voltage transformer 44 is in a fixed position the resistance 19 will vary directly proportional to the rotor frequency. This is the condition leading to a constant torque. The factor of proportionality is controlled through the transformer 44 by means of the control lever 45. Although the resistance 46 is also controlled by the lever 45 it has no influence during driving.

Conditions to be satisfied for braking are similar to those for driving with the only difference that the rotor frequency is now proportional to speed and that the transformer ratio must be in a definite relation to the exciter current. The resistance 46 is therefore graded so that its value relative to the tapping ratio of the transformer 44 now corresponds to the variation of the reactance of the main motor and the requirement to keep the value of resistance 8 at the value giving maximum torque as previously explained, is satisfied.

In the arrangement described above and shown in Figure 5 the means responsive to the speed of the motor is the tachogenerator 15, but it will be appreciated that the required control of the load resistance may be obtained by a mechanical speed sensitive device, such as a centrifugal governor.

To ensure stable operation it is frequently desirable that the torque should not be absolutely constant for a given lever position but that it should vary slightly with speed. The value of the resistance 19 may be arranged to vary with the speed of the motor so that the torque is slightly below its maximum and thereby ensuring that the torque is kept substantially constant and that even if the resistance 19 is not continuously variable but is varied in small steps, the motor will still operate on the stable side of its torque/speed characteristic. Alternatively an inductance may be connected in series with the resistance 19; this has the effect of reducing the effective resistance at the higher frequencies and it is arranged so that during braking, say, maximum torque is obtained only at the highest speed and decreases to 80 or 90% of the maximum at the lowest speed.

I claim:

1. An alternating current electric motor equipment comprising in combination a wound rotor induction motor having a primary winding and a secondary winding rotatable relative to said primary winding, resistance arranged for connection across said secondary winding, and optimum torque controlling means including alternating current electric supply means having an output frequency proportional to the speed of the motor, an electric circuit arranged for connection to said alternating current electric supply means and comprising a control resistance and an inductance, a servo-motor arranged to control the magnitude of both said control resistance and said resistance arranged for connection across said secondary winding, and means responsive to the relative impedance of said control resistance and said inductance arranged to control said servo-motor.

2. An alternating current electric motor equipment as claimed in claim 1, wherein the said alternating current electric supply means comprises an alternating current tachometer generator arranged to be driven by said motor.

3. An alternating current electric motor equipment comprising in combination a wound rotor induction motor, resistance arranged for connection across the rotor winding of the motor, means for supplying direct current to at least part of the stator winding of the motor, means for regulating the magnitude of the said direct current arranged to be supplied to the stator winding, and optimum torque controlling means including alternating current electric supply means having an output frequency proportional to the speed of the motor, an electric circuit arranged for connection to said alternating current electric supply means and comprising a control resistance and an inductance, a servo-motor arranged to control the magnitude of both said control resistance and said resistance arranged for connection across said second motor winding, and means responsive to the relative impedance of said control resistance and said inductance arranged to control said servo-motor.

4. An alternating current electric motor equipment as claimed in claim 3, wherein the said alternating current electric supply means comprises an alternating current tachometer generator arranged to be driven by said motor.

5. An alternating current electric motor equipment comprising in combination a wound rotor induction motor, resistance arranged for connection across the rotor winding of the motor, means for supplying direct current to at least part of the stator winding of the motor, means for regulating the magnitude of the said direct current arranged to be supplied to the stator winding, and optimum torque controlling means including an alternating current tachometer generator arranged to be driven by said motor, an electric circuit arranged for connection to said tachometer generator and comprising a control resistance and an inductance, a sevo-motor arranged to control the magnitude of both said control resistance and said resistance arranged for connection across said rotor winding, and means responsive to the relative impedance of said control resistance and said inductance arranged to control said servo-motor.

6. An alternating current electric motor equipment as claimed in claim 5, wherein said tachometer generator has an exciting winding and a generating winding and means are provided for applying direct current to said exciting winding.

7. An alternating current electric motor equipment comprising in combination a wound rotor induction motor, resistance arranged for connection across the rotor winding of the motor, means for supplying direct current to at least part of the stator winding of the motor, means for regulating the magnitude of the said direct current arranged to be supplied to the stator winding, and optimum torque controlling means including an alternating current tachometer generator having an exciting winding and a generating winding, means for supplying direct current to said exciting winding, a control resistance, an inductance, a differentially-operated servo-motor arranged to control the magnitude of both said control resistance and said resistance arranged for connection across said rotor winding, a first operating winding of said servo-motor series-connected with said control resistance across said tachometer generator output, and a second operating winding of said servo-motor series-connected with said inductance across said tachometer generator output.

8. An alternating current electric motor equipment as claimed in claim 7, wherein there is provided further means for regulating the current supplied by the tachometer generator to said first operating winding of the servo-motor and a torque controlling lever mechanically coupled with both said means for regulating the magnitude of the direct current supplied to the stator winding and said means for regulating the current supplied to the first operating winding of the servo-motor.

9. An alternating current electric motor equipment comprising in combination an electric induction motor having a stator winding and a rotor winding, a tachometer generator driven by said motor and having an exciting winding and a winding for generating alternating current, an electric circuit connected to said generating winding of the tachometer including a control resistance and an inductance, a servo-motor arranged to control the magnitude of said resistance connected across the rotor winding and also said control resistance, means responsive to the relative impedances of said control resistance and said inductance arranged to control said servo-motor to maintain substantially maximum torque, manual control means for controlling the motor to operate selectively as a motor and as a dynamic brake, said manual control means connecting the exciting winding of the tachometer generator to an alternating current supply during operation as a motor and to a direct current supply during operation as a dynamic brake, means for supplying direct current to at least a part of the stator winding of the motor during operation as a dynamic brake and regulator means for said direct current supplied to the stator winding.

ERICH SIEGFRIED FRIEDLANDER.

REFERENCES CITED

The following references are of record in the file of this patent:

UNITED STATES PATENTS

| Number | Name | Date |
|---|---|---|
| 862,168 | James | Aug. 6, 1907 |
| 1,476,059 | Deutschmann | Dec. 4, 1923 |
| 1,492,702 | Deutschmann | May 6, 1924 |
| 2,367,025 | Huston | Jan. 9, 1945 |

FOREIGN PATENTS

| Number | Country | Date |
|---|---|---|
| 117,975 | Australia | Dec. 29, 1943 |
| 535,732 | Great Britain | Apr. 21, 1941 |

OTHER REFERENCES

"BTH Activities," July 1942, pages 167–170.
"BTH Activities," October 1942, pages 183–188.